(12) United States Patent
Schmidt et al.

(10) Patent No.: US 9,697,700 B2
(45) Date of Patent: Jul. 4, 2017

(54) AMBIENT CONDITION DETECTOR WITH PROCESSING OF INCOMING AUDIBLE COMMANDS FOLLOWED BY SPEECH RECOGNITION

(71) Applicant: Honeywell International Inc., Morristown, NJ (US)

(72) Inventors: Mark H. Schmidt, West Islip, NY (US); Tony T. Li, Roslyn Heights, NY (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 461 days.

(21) Appl. No.: 14/085,142

(22) Filed: Nov. 20, 2013

(65) Prior Publication Data
US 2015/0142432 A1 May 21, 2015

(51) Int. Cl.
*G08B 3/10* (2006.01)
*G08B 17/10* (2006.01)
*G10L 15/22* (2006.01)

(52) U.S. Cl.
CPC .............. *G08B 3/10* (2013.01); *G08B 17/10* (2013.01); *G10L 15/22* (2013.01)

(58) Field of Classification Search
CPC .................................................. H04L 12/2816
USPC .................................................. 704/270–277
See application file for complete search history.

(56) References Cited

U.S. PATENT DOCUMENTS 4,519,027 A * 5/1985 Vogelsberg ............. G06F 1/305
340/692
4,876,676 A * 10/1989 Shimizu ................. G04G 21/06
368/262
7,089,099 B2 * 8/2006 Shostak ................. B60C 23/005
701/29.6
7,190,945 B1 3/2007 Crisafulli
2003/0229500 A1 * 12/2003 Morris ..................... G10L 15/26
704/275
2005/0125083 A1 * 6/2005 Kiko ....................... G05B 15/02
700/19
2007/0080819 A1 4/2007 Marks et al.
2009/0043441 A1 * 2/2009 Breed ................. G06K 7/10178
701/31.9

(Continued)

FOREIGN PATENT DOCUMENTS

WO    WO 02/071357 A1    9/2002

OTHER PUBLICATIONS

Meet Nest Protect, https://nest.com/, Nov. 6, 2013.

(Continued)

*Primary Examiner* — Michael N Opsasnick
(74) *Attorney, Agent, or Firm* — Husch Blackwell LLP

(57) ABSTRACT

A monitoring system includes at least one detector having a housing that carries at least one ambient condition sensor. Control circuits carried by the housing are coupled to the at least one ambient condition sensor. A separate audio input transducer carried by the housing is coupled to the control circuits, wherein the control circuits include signal processing circuits coupled to the separate audio input transducer. The signal processing circuits cancel predetermined audio received from the separate audio input transducer and output a processed speech signal that is coupled to speech recognition circuitry. The speech recognition circuitry recognizes selected speech to implement predetermined functions.

19 Claims, 2 Drawing Sheets

(56) References Cited

U.S. PATENT DOCUMENTS

| | | | |
|---|---|---|---|
| 2009/0147938 A1* | 6/2009 | Culter | H04R 27/00 379/202.01 |
| 2012/0166190 A1 | 6/2012 | Lee et al. | |
| 2012/0215537 A1* | 8/2012 | Igarashi | G06F 3/167 704/249 |
| 2013/0024799 A1 | 1/2013 | Fadell et al. | |
| 2013/0204442 A1 | 8/2013 | Modi et al. | |
| 2014/0319231 A1* | 10/2014 | Matsuoka | G05D 22/02 236/51 |

OTHER PUBLICATIONS

Extended European search report from corresponding EP application 14189965.8, dated Apr. 2, 2015.
Canadian patent office Official Action for corresponding CA patent application 2,868,172, dated Nov. 15, 2016.

* cited by examiner

AMBIENT CONDITION DETECTOR WITH PROCESSING OF INCOMING AUDIBLE COMMANDS FOLLOWED BY SPEECH RECOGNITION

FIELD

The application pertains to ambient condition detectors, such as smoke detectors, gas detectors, or the like. More particularly, the application pertains to such detectors that incorporate noise cancellation circuits and speech recognition circuitry to detect incoming verbal commands that direct the detector to perform a predetermined function.

BACKGROUND

Smoke detector alarms may be triggered by cooking, incense, or other sources that are not dangerous. Often, the smoke detector is on the ceiling and requires a ladder to reach. This is inconvenient and potentially dangerous. In addition, nothing is more annoying than going to bed and hearing a low battery chirp.

Another problem is that once a low battery chirp occurs, because it is so infrequent, it is often very difficult to identify where the chip originated, particularly with multiple devices in a home or business.

Silencing smoke detectors is currently done by pressing a button on the detector to mute the device for a period of time or, in some cases, by a remote control. In all cases, a user needs to either go to the device or find the remote control to silence the alarm or low battery chirp. Often, the quickest way to silence a false alarm is to open the detector case and remove the battery. Removing the battery is dangerous because if the battery is not replaced, then no protection is provided.

DETAILED DESCRIPTION

Figure 1:
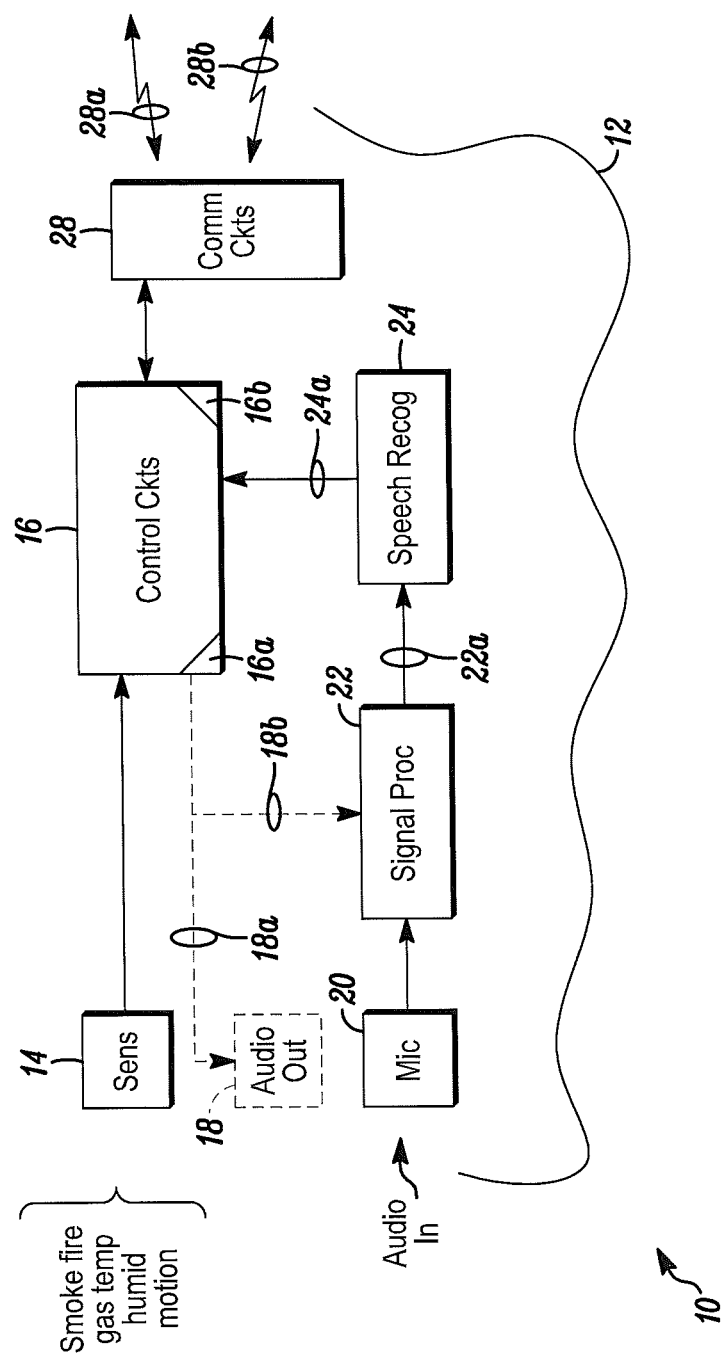
FIG. 1 is a block diagram of an exemplary detector.

While disclosed embodiments can take many different forms, specific embodiments hereof are shown in the drawings and will be described herein in detail with the understanding that the present disclosure is to be considered as an exemplification of the principles hereof as well as the best mode of practicing the same and is not intended to limit the claims hereof to the specific embodiment illustrated.

Various embodiments of ambient condition detectors are discussed herein. Those of skill will understand that these are exemplary only, and other types of ambient condition detectors come within the spirit and scope hereof.

By adding speech recognition to a detector, a user can silence the detector quickly and easily with nothing more than his or her voice. By adding speech recognition to a smoke detector or a detector that is part of a speech enabled security panel or control unit, the ability to mute sounds from a detector verbally from the security panel or voice enabled keypad would be simple, intuitive, and very convenient. Being able to stop a low battery chip without getting out of bed would be a welcome feature.

The speech recognition enabled smoke detector or security system could identify a key word, such as "Hello Smoke Detector," to recognize a command is coming and eliminate false triggers. The device would recognize a number of commands and act on them, such as "Quiet," to mute the device for a period of time. This time would vary based on the state of the smoke detector. For an alarm silence, the mute would be, for, example, 15 minutes. For a low battery chirp, the mute would be, for example, 8 hours, to allow a good night of sleep.

Other functions can include "Find Low battery" for a device having a low battery that could respond by rapid chirping so the device can be easily identified. Status or maintenance functions can also be implemented in noisy environments.

One method of recognizing speech commands while an alarm is in process would be to use noise cancellation circuitry or processing. For example, cancellation or subtraction (using either analog or digital techniques) could be implemented to delete the alarm audio from the microphone input of the device. The known alarm signature would be eliminated or suppressed and not be processed by the speech recognition circuitry. Advantageously, this processing would allow detection of an individual's speech command even in the presence of a high decibel active alarm. Those of skill will understand that a variety of noise cancellation circuits and processes could be used without departing from the spirit and scope hereof.

In the case of a speech enabled security system, the same approach could be taken as above. In addition, since a microphone could be located near the alarm panel or near a speech enabled keypad and displaced from the smoke or gas detectors, the physical separation could be used as an advantage. In this case, an acoustic beam forming microphone array (two or more microphones) could be used to attenuate a high decibel alarm from one direction, and the detector or a system control unit could accept an individual's voice from a different location than the location where the alarm originated.

FIG. 1 illustrates an exemplary detector 10. The components of the detector 10 are carried by a housing 12 and include one or more ambient condition sensors 14 from a class that includes at least smoke, fire, gas, temperature, humidity, and motion sensors, all without limitation. Other types of sensors come within the spirit and scope hereof.

Signals from the sensors 14 are coupled to control circuits 16 that could be implemented, in part, with hard wired circuitry and, in part, with a programmable processor 16a and associated control software 16b.

The housing 12 also carries an audio input transducer, such as a microphone 20. Signals from the microphone 20 can be coupled to a signal processor 22 that can carry out noise cancelling functions. The signal processor 22 could be implemented with hardwired circuitry, in part, and, in part, with a programmable processor and executable control software, such as 16a, 16b. Processed audio can be coupled via a line 22a to speech recognition circuitry 24. Output signals from the speech recognition circuitry 24 indicative of commands or requests for a service as described above can be coupled on line a 24a to the control circuits 16 for implementation.

The detector 10 in another embodiment can include an audio output device 18, for example, a speaker or a piezo based tonal output device. The device 18 can be driven by the control circuits 16 via a signal path 18a. Additionally, this driving signal, for example, an output voltage, can be coupled via a signal path 18b as an input to the signal processing circuitry 22. In this configuration, the signal processing circuitry 22 receives two audio inputs, audio from the microphone 20, and drive signals to the output device 18. Since the signal processor 22 now has two inputs to use in carrying out a noise cancelling function, incoming microphone voice from a local user received at the microphone 20 can more accurately be separated from the ambient noise picked up by the microphone 20 as well as audio output from the device 18, which might be synthetic speech or a tonal output, than when only a single input from the microphone 20 is available.

The circuits 16 can communicate via communications circuits 28 with other detectors or with a system control unit via a wireless medium 28a or a wired medium 28b as would be understood by those of skill in the art. The detector 10 can be Internet enabled and can communicate via the medium 28a using one or more computer networks with other similar detectors or system control units as discussed in more detail relative to FIG. 2.

Those of skill will understand that a variety of hardware and/or software based devices can be used to implement the noise cancelling signal processing circuitry 22. All such variations come within the spirit and scope hereof.

Those of skill will understand that a variety of hardware and/or software based devices can be used to implement the speech recognition circuitry 24. All such variations come within the spirit and scope hereof.

Figure 2:
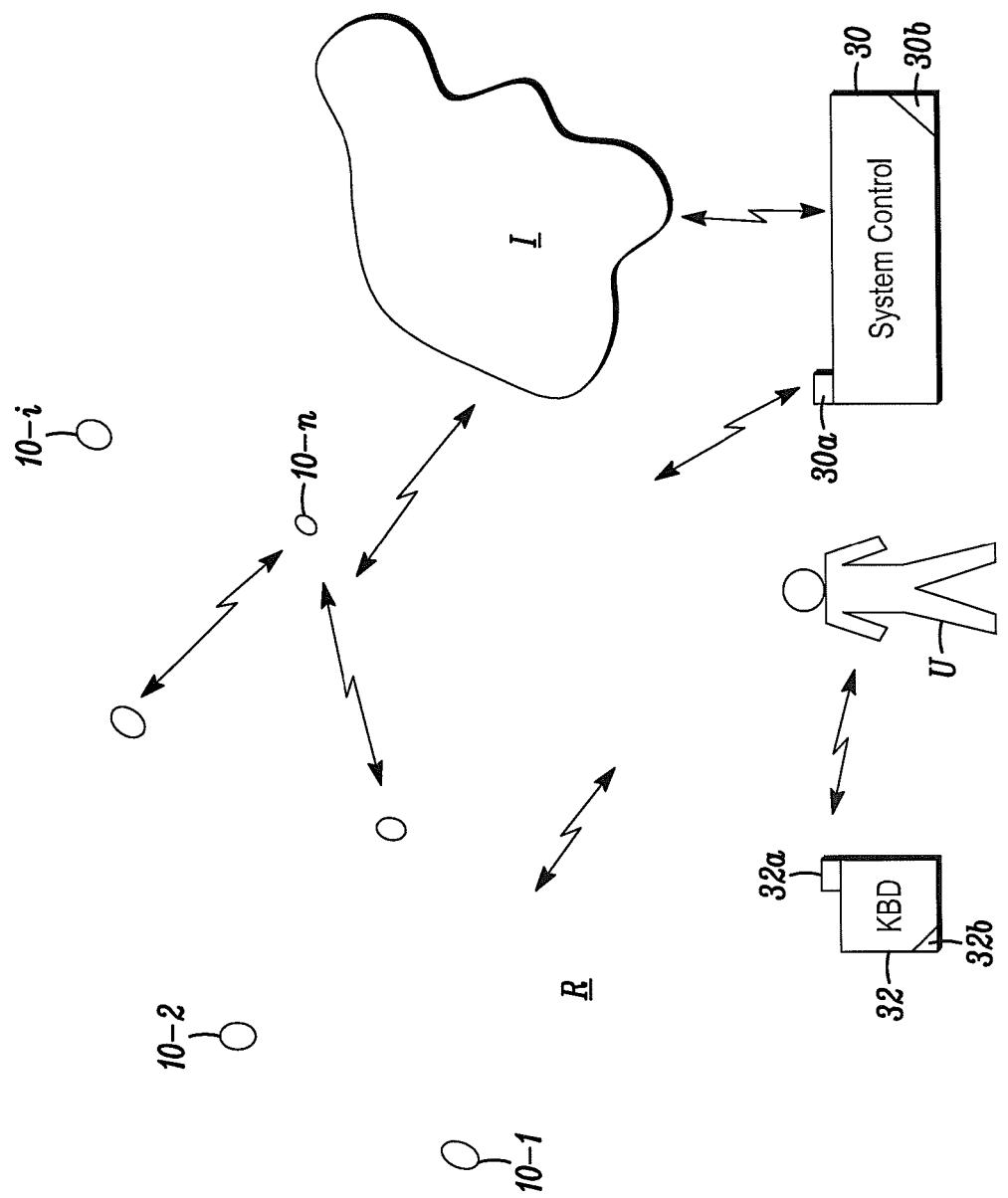
FIG. 2 is a system including a plurality of detectors as in FIG. 1.

As illustrated in FIG. 2, a plurality of detectors 10-1, 10-2 . . . 10-n each of which is substantially identical to the detector 10, can be installed in a region R being monitored. The detectors, such as 10-i, can communicate wirelessly and directly with one another or Internet I. A displaced system control unit 30 can be in communication with the detectors 10-i via wired or wireless media, such as the Internet I.

The system control unit 30 can include and be coupled to a local microphone 30a. A voice enabled keypad 32, also with a microphone 32a, can be displaced from the control unit 30. Either or both of the control unit 30 and the keypad 32 can include respective noise cancellation and/or speech recognition circuits as at 30b, 32b.

As described above, the two microphones can be used to attenuate high decibel audio, for example, a fire alarm, from a detector, such as 10-1, which is emitting non-speech audio, so that speech identification circuitry in the unit 30 can determine an audible command or function request from an adjacent user U for purposes of controlling one or more of the detectors 10-i.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A system comprising:
    a detector having a housing that carries an ambient condition sensor;
    an audio output device carried by the housing that generates audio in response to a predetermined condition;
    an audio input transducer carried by the housing that receives speech audio from a user;
    control circuits carried by the housing and coupled to the ambient condition sensor, wherein the control circuits include signal processing circuits coupled to the audio input transducer, and wherein the signal processing circuits output a processed speech signal based on the speech audio; and
    speech recognition circuitry that receives the processed speech signal and recognizes selected speech to implement predetermined functions,
    wherein, responsive to the processed speech signal indicating a request to silence the audio output device, the control circuits silence the audio output device for a first predetermined time period or a second predetermined time period,
    wherein the predetermined condition is an alarm condition detected by the ambient condition sensor or a low battery condition detected by the control circuits,
    wherein the control circuits silence the audio output device for the first predetermined time period responsive to the request to silence the audio output device when the ambient condition sensor detects the alarm condition,
    wherein the control circuits silence the audio output device for the second predetermined time period responsive to the request to silence the audio output device when the control circuits detect the low battery condition, and
    wherein the first predetermined time period is shorter than the second predetermined time period.

2. The system as in claim 1 wherein the ambient condition sensor is selected from a class that includes at least a smoke sensor, a gas sensor, a humidity sensor, a temperature sensor, a motion sensor, a position sensor, a humidity sensor, a flame sensor, and a radiant energy sensor.

3. The system as in claim 2 wherein the predetermined functions are selected from a class that includes a find low battery function, a maintenance function, a status function, or a transmit a function identifier to another detector.

4. The system as in claim 3 wherein the detector includes communications circuitry coupled to the control circuits of the detector to couple alarm related information to a displaced location via a wired or a wireless medium.

5. The system as in claim 1 further comprising a plurality of substantially identical, separate detectors that communicate with one another wirelessly.

6. The system as in claim 5 wherein each of the plurality of substantially identical, separate detectors includes respective communications circuitry coupled to respective control circuits of a respective one of the plurality of substantially identical, separate detectors to couple alarm related information to other ones of the plurality of substantially identical, separate detectors via a wired or a wireless medium.

7. The system as in claim 6 further comprising a system control unit in communication with the plurality of substantially identical, separate detectors.

8. The system as in claim 7 wherein the system control unit includes a regional fire or gas monitoring function, an HVAC control function, or a security monitoring function.

9. The system as in claim 3 further comprising a plurality of detectors, wherein at least some of the plurality of detectors communicate wirelessly with one another.

10. The system as in claim 9 wherein a first detector of the plurality of detectors implements a function request received from a second detector of the plurality of detectors.

11. The system as in claim 10 further comprising first and second spaced apart microphones to implement a noise cancelling function.

12. The system as in claim 11 wherein the first spaced apart microphone is coupled to a voice enabled control element.

13. The system as in claim 12 wherein the voice enabled control element is selected from a class that includes a keypad and a monitoring system control unit.

14. The system as in claim 6 wherein a first detector the plurality of substantially identical, separate detectors implements a function request received from a second detector of the plurality of substantially identical, separate detectors.

15. The system as in claim 14 further comprising first and second spaced apart microphones to implement a noise cancelling function.

16. The system as in claim 15 wherein the first spaced apart microphone is coupled to a voice enabled control element, and wherein the voice enabled control element is selected from a class that includes a keypad and a monitoring system control unit.

17. The system as in claim 16 wherein the voice enabled control element is coupled to at least one of a fire monitoring system, a gas monitoring system, and an HVAC control system.

18. The system as in claim 1 wherein the audio generated by the audio output device is a speech output or a non-speech output.

19. A system comprising:
a detector having a housing that carries an ambient condition sensor;
control circuits carried by the housing that are coupled to the ambient condition sensor, wherein the control circuits include signal processing circuits;
an audio output device carried by the housing that emits audio in response to a predetermined condition, wherein a drive signal for the audio output device is coupled to the signal processing circuits;
an audio input transducer carried by the housing that is coupled to the signal processing circuits, wherein the audio input transducer receives speech audio from a user, and wherein the signal processing circuits output a processed speech signal based on the speech audio; and
speech recognition circuitry that receives the processed speech signal and recognizes selected speech to implement predetermined functions,
wherein, responsive to the processed speech signal indicating a request to silence the audio output device, the control circuits silence the audio output device for a first predetermined time period or a second predetermined time period,
wherein the predetermined condition is an alarm condition detected by the ambient condition sensor or a low battery condition detected by the control circuits,
wherein the control circuits silence the audio output device for the first predetermined time period responsive to the request to silence the audio output device when the ambient condition sensor detects the alarm condition,
wherein the control circuits silence the audio output device for the second predetermined time period responsive to the request to silence the audio output device when the control circuits detect the low battery condition, and
wherein the first predetermined time period is shorter than the second predetermined time period.

\* \* \* \* \*